US012135516B2

(12) United States Patent
Tanaka

(10) Patent No.: US 12,135,516 B2
(45) Date of Patent: Nov. 5, 2024

(54) TEMPERATURE CONTROL DEVICE AND IMAGE FORMING APPARATUS INCLUDING TEMPERATURE CONTROL DEVICE

(71) Applicant: TOSHIBA TEC KABUSHIKI KAISHA, Tokyo (JP)

(72) Inventor: Masaya Tanaka, Sunto Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/123,516

(22) Filed: Mar. 20, 2023

(65) Prior Publication Data

US 2023/0288851 A1 Sep. 14, 2023

Related U.S. Application Data

(63) Continuation of application No. 17/691,055, filed on Mar. 9, 2022, now Pat. No. 11,630,405.

(51) Int. Cl.
*G03G 15/20* (2006.01)
*G03G 15/00* (2006.01)

(52) U.S. Cl.
CPC ....... *G03G 15/205* (2013.01); *G03G 15/2039* (2013.01); *G03G 15/5045* (2013.01)

(58) Field of Classification Search
CPC ......................... G03G 15/205; G03G 15/2039
See application file for complete search history.

(56) References Cited

U.S. PATENT DOCUMENTS

2011/0142472 A1 6/2011 Mitsuoka et al.
2021/0364956 A1* 11/2021 Usami ................ G05D 23/1919

FOREIGN PATENT DOCUMENTS

JP 2005-234417 A 9/2005
JP 2008-304848 A 12/2008

OTHER PUBLICATIONS

Notice of Allowance on U.S. Appl. No. 17/691,055 DTD Dec. 22, 2022.

* cited by examiner

*Primary Examiner* — Walter L Lindsay, Jr.
*Assistant Examiner* — Andrew V Do
(74) *Attorney, Agent, or Firm* — Foley & Lardner LLP

(57) ABSTRACT

An image forming apparatus, temperature control method, and temperature control device are provided. The apparatus includes the device, which acquires a first temperature difference between a temperature estimation value of a fixer, which is obtained by simulating a member temperature of a temperature control target serving as a heat capacitor-resistor circuit at an initial stage of operation of the fixer, and a detected temperature detected by a temperature sensor, and acquires a second temperature difference between a temperature estimation value of the fixer, which is obtained during an operation after the first temperature difference is acquired, and a detected temperature. The device calculates a difference between the first temperature difference and the second temperature difference, determines that the detected temperature is abnormal in response to the difference being equal to or greater than a threshold value, and performs temperature control for correcting a target temperature of the member temperature.

15 Claims, 7 Drawing Sheets

TEMPERATURE CONTROL DEVICE AND IMAGE FORMING APPARATUS INCLUDING TEMPERATURE CONTROL DEVICE

CROSS-REFERENCE TO RELATED APPLICATION

This application is a continuation of U.S. patent application Ser. No. 17/691,055, filed on Mar. 9, 2022, the entire contents of which are incorporated herein by reference.

FIELD

Embodiments described herein relate to a temperature control device, a temperature control method, and an image forming apparatus including the temperature control device.

BACKGROUND

An image forming apparatus includes a fixing unit that fixes a toner image onto a recording medium, onto which the toner image is transferred, by applying heat and pressure to the recording medium. The fixing unit includes a fixing rotating body (a heat roller), a pressing member (a press roller), a heating member (a lamp, an IH heater, or the like), a temperature sensor, and the like. The temperature sensor detects a temperature of a surface of the heat roller. A controller that controls the fixing unit controls the surface temperature of the heat roller to a target value by increasing or decreasing an amount of power, which is supplied to the heating member, based on a detection signal (temperature sensor signal) of the temperature sensor.

For example, if a detection unit is deformed, foreign matter is caught between the heat roller and the temperature sensor, and/or contamination occurs on the surface of the heat roller, even if the temperature sensor itself is normal, the detected temperature of the surface of the heat roller may not be correctly detected. When the temperature detected by the temperature sensor is abnormal, for example, when a temperature lower than an actual temperature is detected, there is a possibility that temperature control for heating the heat roller to a temperature higher than a normal temperature of the heat roller is performed.

DETAILED DESCRIPTION

Figure 1:
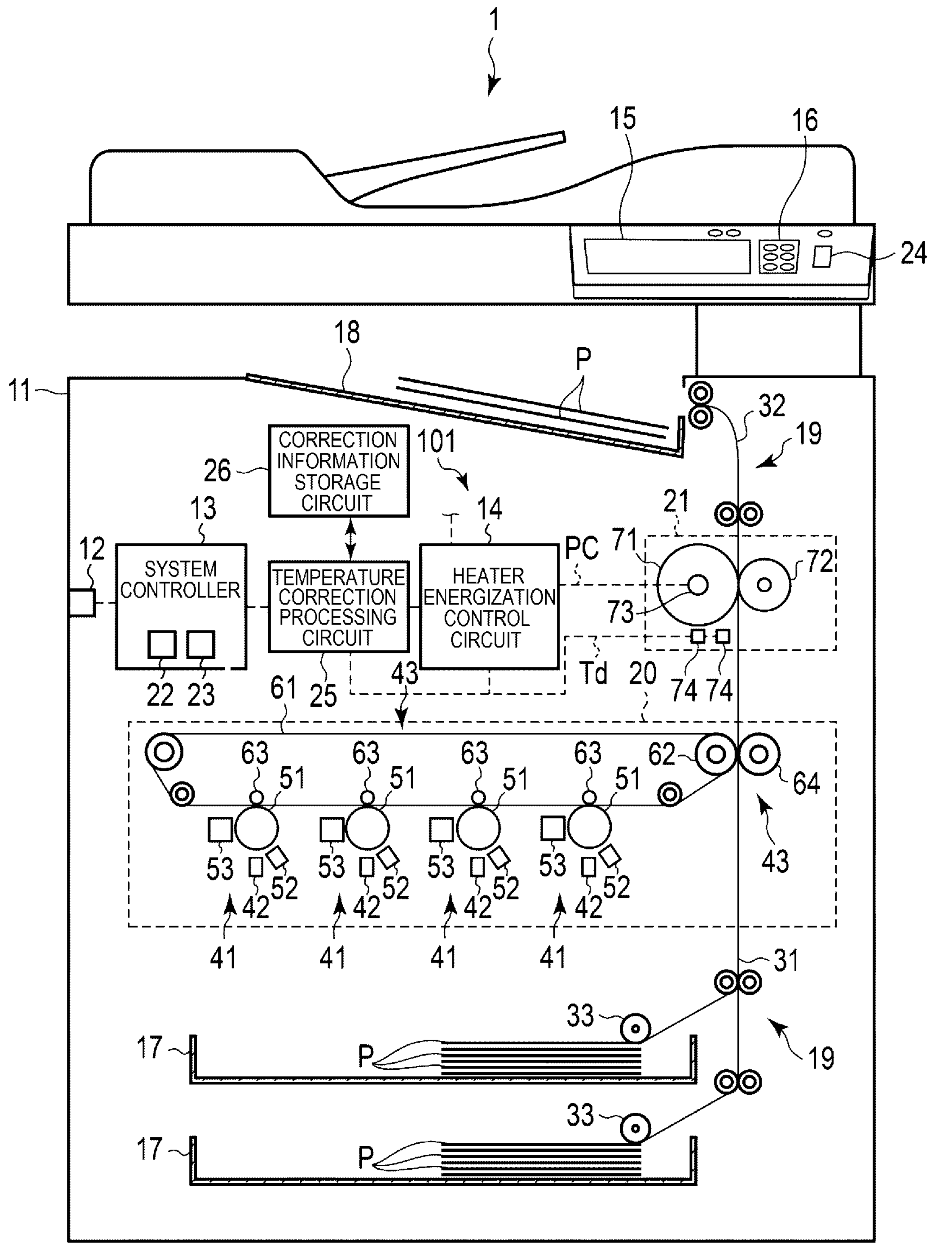
FIG. 1 conceptually shows an overall configuration example of an image forming apparatus according to an embodiment.

A temperature control device according to an embodiment is a device that performs, by weighted average control with an estimated temperature (WAE) control, temperature control of a fixing unit (e.g., a fixer) mounted in an image forming apparatus. The temperature control device controls a temperature of the fixing unit by using a control signal obtained by adding a temperature estimation value of the fixing unit obtained in the WAE control during operation and a detected temperature detected by the temperature sensor. As will be described later, the WAE control is a technique for simulating a member temperature of a temperature control target serving as a heat capacitor-resistor (CR) circuit, and is temperature control using a temperature estimation value of the fixing unit obtained by estimating (e.g., calculating) a temperature of a surface of a heat roller, which is a temperature control target, based on a heat capacity (C) of the heat roller that is a heating target, a heat resistance (R) of the fixing unit, an input energy to the fixing unit, and the like.

The temperature control device according to the present embodiment stores, as a first temperature difference, a temperature difference between a temperature estimation value obtained in the WAE control during a first operation of the fixing unit or during an initial operation of the fixing unit and a detected temperature detected by the temperature sensor. Hereinafter, the first operation or the initial operation of the fixing unit is referred to as an initial stage of operation. The initial stage of operation (e.g., the first operation or the initial operation) is, for example, in the image forming apparatus 1, when a fixing unit 21 is operated for a first time after being manufactured, when the fixing unit 21 is operated for a first time after being replaced, or when the fixing unit 21 is operated for a first time after replacement or repair of components related to heat in the fixing unit 21. When the fixing unit 21 is replaced or repaired, temperature correction information (e.g., a first temperature difference Ti) stored in a correction information storage circuit 26, which will be described later, is reset.

Whether the fixing unit 21 is in the first operation or in the initial stage of operation can be determined based on an instruction from a system controller 13 or whether the first temperature difference Ti is stored in the correction information storage circuit 26. The system controller 13 holds information of whether the apparatus is in an initial start-up state or not and history information of replacement or repair of the fixing unit.

Thereafter, during an operation after the initial stage of operation in which the first temperature difference is acquired, a temperature difference between the temperature estimation value obtained in the WAE control and the detected temperature detected by the temperature sensor is calculated at any time with a set time interval, as a second temperature difference. The first temperature difference and the second temperature difference are compared, and a difference therebetween is calculated. If it is determined that the difference is equal to or greater than a preset temperature difference (e.g., threshold value), it is determined that the detected temperature is abnormal, and the target temperature is corrected by adjustment in which the difference is added to or deleted from the target temperature.

Figure 2:
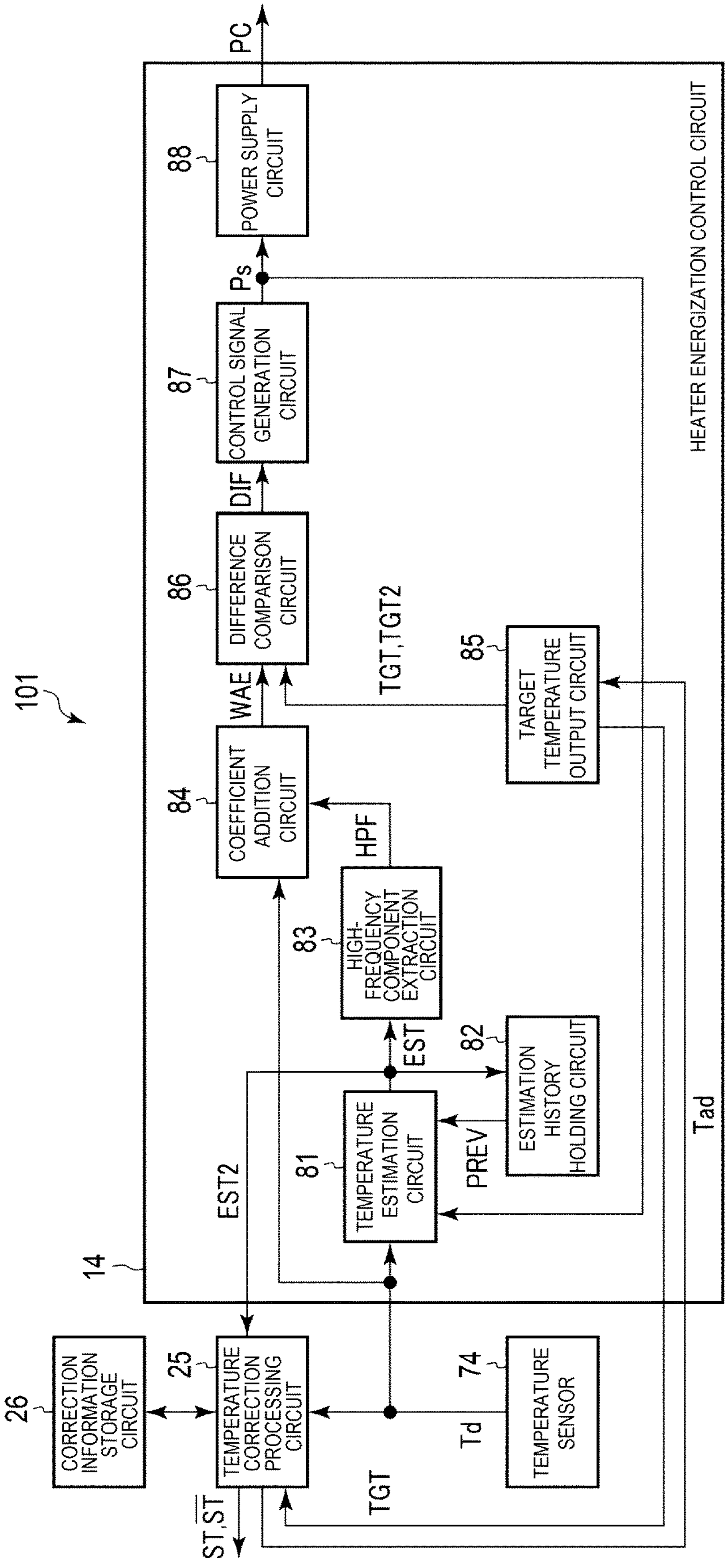
FIG. 2 is a block diagram showing a configuration example of a temperature control device.

Hereinafter, the temperature control device, the temperature control method, and the image forming apparatus according to the embodiment will be described with reference to the drawings. FIG. 1 conceptually shows an overall configuration example of the image forming apparatus according to the present embodiment, and FIG. 2 is a block diagram showing a configuration example of the temperature control device.

The image forming apparatus 1 is, for example, a multifunction printer (e.g., MFP) that performs various processes, such as image formation, while conveying a recording medium such as printing paper. Alternatively, the image forming apparatus 1 is a solid-state scanning printer (for example, a light emitting diode printer) that scans a light emitting diode (LED) array and performs various processes, such as image formation, while conveying a recording medium. The image forming apparatus 1 of these types has a configuration in which, for example, toner is received from a toner cartridge and an image is formed on the recording medium by the received toner. The toner may be a single color toner, or may be a color toner of a plurality of colors such as cyan, magenta, yellow, black, and/or the like. The toner may be a decolorable toner that is decolored when heat is applied after printing.

As shown in FIG. 1, the image forming apparatus 1 includes a housing 11, a communication interface 12, the system controller 13, a heater energization control circuit 14, a display unit 15, an operation interface 16, a plurality of paper trays 17, a paper discharge tray 18, a conveyance unit 19, an image forming unit 20, the fixing unit 21 (e.g., a fixer), a main power switch 24, a temperature correction processing circuit 25, and a correction information storage circuit 26.

The housing 11 is a main body of the image forming apparatus 1. The housing 11 accommodates the communication interface 12, the system controller 13, the heater energization control circuit 14, the display unit 15, the operation interface 16, the plurality of paper trays 17, the paper discharge tray 18, the conveyance unit 19, the image forming unit 20, the fixing unit 21, a processor 22, the temperature correction processing circuit 25, and the correction information storage circuit 26. A temperature control device 101 includes the heater energization control circuit 14, the temperature correction processing circuit 25, the correction information storage circuit 26, and a temperature sensor 74 of the fixing unit 21.

First, a configuration of a control system of the image forming apparatus 1 will be described.

The communication interface 12 is a connection device that enables communication with other devices such as a host device (e.g., external device). The communication interface 12 includes, for example, a network connection terminal for a wired connection using a local area network (LAN) connector or the like. The communication interface 12 may have a function of performing wireless communication with other devices according to a standard such as Bluetooth (registered trademark) or Wi-Fi (registered trademark).

The system controller 13 controls the image forming apparatus 1. The system controller 13 includes, for example, the processor 22 and a memory 23.

As the memory 23, a read-only nonvolatile memory such as a read only memory (ROM), a nonvolatile memory capable of writing and reading at any time such as a flash ROM, a solid state drive (SSD), and a hard disk drive (HDD), or a volatile memory capable of writing and reading at any time such as a random access memory (RAM) can be applied, and these memories may be used in combination as appropriate. The memory 23 stores a program, data used in the program, and the like. The memory 23 also functions as a working memory. That is, the memory 23 temporarily stores data being processed by the processor 22, a program to be executed by the processor 22, and the like.

The processor 22 is, for example, an arithmetic element such as a central processing unit (CPU), and executes arithmetic processing.

The processor 22 functions as a control unit capable of executing various operations by executing the program stored in the memory 23. The processor 22 executes various arithmetic processes and processes related to determination using the data stored in the memory 23.

For example, the processor 22 generates a print job based on an image acquired from an external device via the communication interface 12. The processor 22 stores the generated print job in the memory 23. The print job includes image data indicating an image to be formed on a recording medium P. The image data may be data for forming an image on one recording medium P or data for forming an image on a plurality of recording media P. The print job includes information indicating whether the print job is color printing or monochrome printing. Further, the print job may include information such as the number of copies to be printed (e.g., the number of page sets) and the number of pages to be printed per copy (e.g., the number of pages).

The processor 22 generates, based on the generated print job, print control information for controlling operations of the conveyance unit 19, the image forming unit 20, and the fixing unit 21. The print control information includes information indicating a timing of paper feeding. The processor 22 transmits the print control information to the heater energization control circuit 14.

The processor 22 functions as a controller (e.g., an engine controller) that controls the operations of the conveyance unit 19 and the image forming unit 20 by executing the program stored in the memory 23. That is, the processor 22 controls conveyance of the recording medium P by the conveyance unit 19, formation of an image on the recording medium P by the image forming unit 20, and the like.

The image forming apparatus 1 may separately include the engine controller and the system controller 13. In this case, the engine controller controls the conveyance of the recording medium P by the conveyance unit 19, the formation of an image on the recording medium P by the image forming unit 20, and the like. In this case, the system controller 13 supplies information necessary for the control operation to the engine controller.

The image forming apparatus 1 includes a power conversion circuit for supplying a direct current (DC) voltage to each component in the image forming apparatus 1 by using an alternating current (AC) voltage of an AC power supply AC. The power conversion circuit supplies a DC voltage necessary for operations of the processor 22 and the memory 23 to the system controller 13. The power conversion circuit supplies a DC voltage necessary for image formation to the image forming unit 20. The power conversion circuit supplies a DC voltage necessary for conveyance of the recording medium to the conveyance unit 19. The power conversion circuit supplies a DC voltage for driving a heater 73 of the fixing unit 21 to the heater energization control circuit 14.

The heater energization control circuit 14 generates power PC and supplies the power PC to the heater 73 of the fixing unit 21. The heater energization control circuit 14 is included in components of the temperature control device 101 according to the present embodiment. The heater energization control circuit 14 will be described in detail later.

The display unit 15 includes a display that displays a screen according to a video signal input from the system controller 13. A graphic controller or the like may be used instead of the system controller 13. For example, the display of the display unit 15 displays a screen for various settings of the image forming apparatus 1.

The main power switch 24 is a switch that supplies or cuts off power for driving the image forming apparatus 1 by an ON operation or an OFF operation. By the ON operation of the main power switch 24, the image forming apparatus 1 is started, and by the OFF operation of the main power switch 24, the driving of the image forming apparatus 1 is stopped. By the ON operation or the OFF operation of the main power switch 24, the fixing unit 21 is also started or stopped.

The operation interface 16 is connected to an operation member described below. The operation interface 16 supplies an operation signal corresponding to an operation of the operation member to the system controller 13. Examples of the operation member include a touch sensor, a numeric keypad, a paper feed key, various function keys, and a keyboard. The touch sensor acquires information indicating a position designated in a certain area. The touch sensor is configured as a touch panel integrally with the display unit 15, and inputs a signal indicating a touched position on the screen displayed on the display unit 15 to the system controller 13.

The plurality of paper trays 17 are cassettes that are detachably attached to the housing 11 and that accommodate the recording media P of the same size or different sizes in each cassette unit. The paper tray 17 supplies the recording medium P to the conveyance unit 19. The paper discharge tray 18 is a tray that supports the recording medium P discharged from the image forming apparatus 1.

Next, a configuration for conveying the recording medium P of the image forming apparatus 1 will be described.

The conveyance unit 19 is a mechanism that conveys the recording medium P in the image forming apparatus 1. As shown in FIG. 1, the conveyance unit 19 includes a plurality of conveyance paths. For example, the conveyance unit 19 includes a paper feeding conveyance path 31 and a paper discharging conveyance path 32.

Each of the paper feeding conveyance path 31 and the paper discharging conveyance path 32 includes a plurality of motors, a plurality of rollers, and a plurality of guides. Under control of the system controller 13, the plurality of motors rotate shafts, and thereby the rollers driven by rotation of the shafts are rotated. The plurality of rollers rotates to move the recording medium P. The plurality of guides prevent the recording medium P from being skewed during the conveyance.

The paper feeding conveyance path 31 picks up the recording medium P from each paper tray 17 by a pickup roller 33, and supplies each of the picked recording medium P to the image forming unit 20.

The paper discharging conveyance path 32 is a conveyance path along which the recording medium P on which an image is formed is discharged from the housing 11. The recording medium P discharged along the paper discharging conveyance path 32 is accommodated in the paper discharge tray 18.

Next, the image forming unit 20 will be described.

The image forming unit 20 forms an image on the recording medium P based on the print job generated by the processor 22. The image forming unit 20 includes a plurality of process units 41, a plurality of exposure devices 42, and a transfer mechanism 43. In the image forming unit 20, one exposure device 42 is provided for each process unit 41. The plurality of process units 41 have the same configuration, and the plurality of exposure devices 42 have the same configuration.

First, the process unit 41 will be described.

The process unit 41 is connected with the toner cartridge for supplying toners of different colors, and forms a toner image. The plurality of process units 41 are provided for respective colors of toner, and correspond to, for example, toner of colors such as cyan, magenta, yellow, and black, respectively. The toner cartridge includes a toner accommodating container and a toner delivery mechanism. The toner accommodating container is a container for supplying toner to be accommodated. The toner delivery mechanism is a mechanism including a screw or the like for delivering the toner in the toner accommodating container.

Hereinafter, one set including the process unit 41 and the exposure device 42 will be described as a representative example.

The process unit 41 includes a photosensitive drum 51, an electrostatic charger 52, and a developing device 53. The photosensitive drum 51 is a photosensitive member including a cylindrical drum and a photosensitive layer formed at an outer circumferential surface of the drum. The photosensitive drum 51 is rotated at a constant speed by a driving mechanism including a gear, a belt, and the like.

The electrostatic charger 52 uniformly charges a surface of the photosensitive drum 51. For example, the electrostatic charger 52 charges the photosensitive drum 51 to a uniform negative potential (e.g., contrast potential) by applying a voltage (e.g., developing bias voltage) to the photosensitive drum 51 using an electrostatic charging roller. The electrostatic charging roller rotates following rotation of the photosensitive drum 51 in a state of applying a predetermined pressure to the photosensitive drum 51.

The developing device 53 is a device that causes toner to adhere to the photosensitive drum 51. The developing device 53 includes a developer container, a stirring mechanism, a developing roller, a doctor blade, an automatic toner control (ATC) sensor, and the like. The developer container is a container that receives and accommodates the toner sent out from the toner cartridge. In the developer container, a carrier is accommodated in advance. The toner sent out from the toner cartridge is stirred with the carrier by the stirring mechanism, and thereby a developer in which the toner and the carrier are mixed is formed. The carrier is accommodated in the developer container at the time of manufacturing the developing device 53.

The developing roller rotates in the developer container and the developer adheres to a surface of the developing roller. The doctor blade is a member disposed with a predetermined interval away from the surface of the developing roller. The doctor blade partially removes a top portion of the developer that is adhered to the surface of the rotating developing roller. Thus, a layer of the developer having a constant thickness corresponding to the interval between the doctor blade and the surface of the developing roller is formed on the surface of the developing roller.

The ATC sensor is, for example, a magnetic flux sensor that includes a coil and that detects a voltage value generated in the coil. The detected voltage of the ATC sensor changes depending on a density of a magnetic flux from the toner in the developer container. That is, the system controller 13 determines a concentration ratio (e.g., toner concentration ratio) of the toner remaining in the developer container to the carrier based on the detected voltage of the ATC sensor. Based on the toner concentration ratio, the system controller 13 operates a motor that drives a delivery mechanism of the toner cartridge, so as to send the toner from the toner cartridge to the developer container of the developing device 53.

Next, the exposure device 42 will be described.

The exposure device 42 includes a plurality of light emitting elements. The exposure device 42 forms a latent image on the photosensitive drum 51 by emitting light from the light emitting elements to the charged photosensitive drum 51. The light emitting element is, for example, a light emitting diode (LED). One light emitting element is configured to emit light to one point on the photosensitive drum 51. The plurality of light emitting elements are arranged in a main scanning direction that is a direction parallel to a rotation axis of the photosensitive drum 51.

The exposure device 42 forms one line of a latent image on the photosensitive drum 51 by emitting light from the plurality of light emitting elements arranged in the main scanning direction to the photosensitive drum 51. The exposure device 42 forms a plurality of lines of a latent image by continuously emitting light to the rotating photosensitive drum 51.

With the process unit 41 having the above-described configuration, when the surface of the photosensitive drum 51 charged by the electrostatic charger 52 is irradiated with light from the exposure device 42, an electrostatic latent image is formed. When the layer of the developer formed on the surface of the developing roller approaches the surface of the photosensitive drum 51, the toner contained in the developer adheres to the latent image formed on the surface of the photosensitive drum 51. Thus, a toner image is formed on the surface of the photosensitive drum 51.

Next, the transfer mechanism 43 will be described.

The transfer mechanism 43 transfers the toner image formed on the surface of the photosensitive drum 51 to the recording medium P. The transfer mechanism 43 includes, for example, a primary transfer belt 61, a secondary transfer counter roller 62, a plurality of primary transfer rollers 63, and a secondary transfer roller 64.

The primary transfer belt 61 is an endless belt wound around the secondary transfer counter roller 62 and a plurality of winding rollers. An inner surface (e.g., inner circumferential surface) of the primary transfer belt 61 is in contact with the secondary transfer counter roller 62 and the plurality of winding rollers, and an outer surface (outer circumferential surface) of the primary transfer belt 61 faces the photosensitive drum 51 of the process unit 41.

The secondary transfer counter roller 62 is rotated by a motor serving as a drive source. The secondary transfer counter roller 62 rotates to convey the primary transfer belt 61 in a predetermined conveyance direction. The plurality of winding rollers are configured to be freely rotatable. The plurality of winding rollers rotate according to a movement of the primary transfer belt 61 caused by the secondary transfer counter roller 62.

Each of the primary transfer rollers 63 brings the primary transfer belt 61 into contact with the photosensitive drum 51 of the process unit 41. Specifically, each of the plurality of primary transfer rollers 63 is provided at a position facing the corresponding photosensitive drum 51 of the process unit 41 with the primary transfer belt 61 sandwiched therebetween. The primary transfer roller 63 is in contact with the inner circumferential surface of the primary transfer belt 61 and displaces the primary transfer belt 61 toward the photosensitive drum 51. Thus, the primary transfer roller 63 brings the outer circumferential surface of the primary transfer belt 61 into contact with the photosensitive drum 51.

The secondary transfer roller 64 is provided at a position facing the secondary transfer counter roller 62 with the primary transfer belt 61 sandwiched therebetween. The secondary transfer roller 64 is in contact with the outer circumferential surface of the primary transfer belt 61 and applies pressure to the outer circumferential surface. Thus, a transfer nip is formed in which the secondary transfer roller 64 and the outer circumferential surface of the primary transfer belt 61 are in close contact with each other. When the recording medium P passes through the secondary transfer roller 64, the secondary transfer roller 64 presses the recording medium P, which passes through the transfer nip, against the outer circumferential surface of the primary transfer belt 61.

The secondary transfer roller 64 and the secondary transfer counter roller 62 rotate to convey the recording medium P supplied from the paper feeding conveyance path 31 while sandwiching the recording medium P. Thus, the recording medium P passes through the transfer nip.

In the transfer mechanism 43 having the above configuration, when the outer circumferential surface of the primary transfer belt 61 comes into contact with the photosensitive drum 51, the toner image formed on the surface of the photosensitive drum is transferred to the outer circumferential surface of the primary transfer belt 61. If the image forming unit 20 includes the plurality of process units 41, the toner image is transferred from the photosensitive drums 51 of the plurality of process units 41 to the outer circumferential surface of the primary transfer belt 61. The transferred toner image is conveyed by the primary transfer belt 61 to the transfer nip where the secondary transfer roller 64 and the outer circumferential surface of the primary transfer belt 61 are in close contact with each other. If the recording medium P is present in the transfer nip, the toner image transferred to the outer circumferential surface of the primary transfer belt 61 is transferred to the recording medium P in the transfer nip.

Next, a configuration related to fixing of the image forming apparatus 1 will be described.

The fixing unit 21 fixes the toner image to the recording medium P to which the toner image is transferred. The fixing unit 21 operates under the control of the system controller 13 and the temperature control device 101. The fixing unit 21 includes a fixing rotating body, a pressing member, and a heating member. The fixing rotating body that is a temperature control target is a heat roller 71 that is rotated by a driving source such as a motor. The heat roller 71, which is the temperature control target, is heated by the heater 73. Therefore, a temperature of the heat roller 71 is controlled by adjusting power supplied to the heater 73. The pressing member is, for example, a press roller 72. The fixing unit 21 further includes a temperature sensor (e.g., thermal sensor) 74 that detects a temperature of a surface of the heat roller 71.

The heat roller 71 includes a core metal formed in a hollow shape and an elastic layer formed on an outer circumference of the core metal. In the heat roller 71, an inside of the core metal formed in a hollow shape is heated by the heater 73 disposed inside the core metal. Heat generated inside the core metal is transmitted to the surface of the heat roller 71 (that is, a surface of the elastic layer), which is an outside of the core metal.

The press roller 72 is provided at a position facing the heat roller 71. The press roller 72 includes a core metal, which has a predetermined outer diameter, and an elastic layer formed on the outer circumference of the core metal. The press roller 72 is provided with a tension member for applying a pressure to the heat roller 71. Pressure is applied from the press roller 72 to the heat roller 71 due to a stress applied from the tension member, so that a nip (e.g., a fixing nip) in which the press roller 72 and the heat roller 71 are in close contact with each other is formed. The press roller 72 is rotated by a motor. The press roller 72 rotates to move the recording medium P that enters the fixing nip and press the recording medium P against the heat roller 71.

The heater 73 is a device that generates heat by the power PC supplied from the heater energization control circuit 14. The heater 73 is, for example, a halogen heater. The halogen heater is supplied with the power PC from the heater energization control circuit 14 to generate electromagnetic waves. The electromagnetic waves are radiated to the inside of the core metal of the heat roller 71, and the heat roller 71 generates heat. Alternatively, the heater 73 may be, for example, a lamp heater, an induction (IH) heater, a resistance heater, or the like.

The temperature sensor 74 detects the temperature of the surface of the heat roller 71. The temperature sensor 74 is, for example, a sensor element such as a thermistor, and may be another temperature sensor. For example, a plurality of temperature sensors 74 may be arranged in parallel with a rotation axis of the heat roller 71. In the present embodiment, if a plurality of temperature sensors are provided, an average value of detection signals that are respectively output from the temperature sensors 74 is used as one detection signal.

As a matter of course, in the present embodiment, it is possible to determine not only a temperature abnormality for the detection signal of one average value, but also a temperature abnormality for each detection signal of each temperature sensor 74. For example, if one or more temperature abnormalities are detected in the plurality of temperature sensors 74, weighting may be performed according to arrangement locations of the sensors, and it may be determined whether to perform a correction according to the weighting (e.g., importance) or not. Alternatively, it may be determined whether to perform a temperature correction or not even if one temperature abnormality occurs. The temperature sensor 74 may be provided at a position where at least a temperature change of the heat roller 71 can be detected. A detected temperature Td detected by the temperature sensor 74 is supplied to the temperature correction processing circuit 25 and the heater energization control circuit 14.

As described above, the heat roller 71 and the press roller 72 of the fixing unit 21 apply heat and pressure to the recording medium P that passes through the fixing nip. The toner on the recording medium P is melted by the heat applied from the heat roller 71, and is coated to a surface of the recording medium P by the pressure applied from the heat roller 71 and the press roller 72. Thus, the toner image is fixed to the recording medium P that passes through the fixing nip. The recording medium P that passes through the fixing nip is introduced into the paper discharging conveyance path 32 and is discharged to an outside of the housing 11.

Next, the temperature control device 101 will be described with reference to FIG. 1 and FIG. 2.

The temperature control device 101 includes the heater energization control circuit 14, the temperature correction processing circuit 25, the correction information storage circuit 26, and the temperature sensor 74. In this example, the temperature correction processing circuit 25 is independently provided as an arithmetic processing circuit (e.g., processor), but is not particularly limited, and the temperature correction processing circuit 25 may be provided in the processor 22 of the system controller 13 of the image forming apparatus 1, or may be provided in another control circuit. The correction information storage circuit 26 may also be provided in the memory 23 of the system controller 13.

The heater energization control circuit 14 includes a temperature estimation circuit 81, an estimation history holding circuit 82, a high-frequency component extraction circuit 83, a coefficient addition circuit 84, a target temperature output circuit 85, a difference comparison circuit 86, a control signal generation circuit 87, and a power supply circuit 88.

The heater energization control circuit 14 generates the power PC and supplies the power PC to the heater 73 of the fixing unit 21. A heat generation amount of the heater 73 is adjusted according to an amount of power of the power PC, and the heater 73 controls the temperature of the heat roller 71. The detected temperature Td detected by the temperature sensor 74 is input to the heater energization control circuit 14.

The temperature estimation circuit 81 performs a temperature estimation process for estimating the temperature of the surface of the heat roller 71. When the WAE control is started, the temperature estimation circuit 81 generates a temperature estimation result EST based on the detected temperature Td, an estimation history PREV, and an energization pulse Ps. The temperature estimation result EST is output to the high-frequency component extraction circuit 83. The temperature estimation result EST is output to the temperature correction processing circuit 25 as a temperature estimation result EST2. Here, for ease of explanation, the same temperature estimation result EST is distinguished in names into the temperature estimation result EST and the temperature estimation result EST2. The temperature estimation circuit 81 may be configured to generate the temperature estimation result EST based on the detected temperature Td, the estimation history PREV, the energization pulse Ps, and a voltage (e.g., rated voltage) applied to the heater 73 when the energization pulse Ps is applied.

The estimation history holding circuit 82 holds a history of the temperature estimation result EST. The estimation history holding circuit 82 outputs the estimation history PREV, which is the history of the temperature estimation result EST (e.g., past temperature estimation result EST), to the temperature estimation circuit 81.

The high-frequency component extraction circuit 83 performs a high pass filter process for extracting a high-frequency component of the temperature estimation result EST. The high-frequency component extraction circuit 83 outputs a high-frequency component HPF, which is a signal indicating the extracted high-frequency component, to the coefficient addition circuit 84.

The coefficient addition circuit 84 performs a coefficient addition process, which is a correction, on the detected temperature Td detected by the temperature sensor 74. The detected temperature Td and the high-frequency component HPF extracted by the high-frequency component extraction circuit 83 are input to the coefficient addition circuit 84. The coefficient addition circuit 84 corrects the detected temperature Td based on the high-frequency component HPF. Specifically, the coefficient addition circuit 84 multiplies the high-frequency component HPF by a preset coefficient, and adds a result of the multiplication to the detected temperature Td to calculate a temperature estimation value WAE.

The coefficient addition circuit 84 outputs the temperature estimation value WAE to the difference comparison circuit 86.

The target temperature output circuit 85 outputs a preset target temperature TGT to the difference comparison circuit 86 and the temperature correction processing circuit 25. When a target temperature correction signal Tad output from the temperature correction processing circuit 25 to be described later is input to the target temperature output circuit 85, the target temperature output circuit 85 outputs a corrected target temperature TGT2, which is obtained by correcting the target temperature TGT, to the difference comparison circuit 86.

The difference comparison circuit 86 performs a difference calculation process. The difference comparison circuit 86 calculates a difference DIF between the target temperature TGT or the corrected target temperature TGT2 output from the target temperature output circuit 85 and the temperature estimation value WAE output from the coefficient addition circuit 84, and outputs the difference DIF to the control signal generation circuit 87.

The control signal generation circuit 87 generates the energization pulse Ps, which is a pulse signal for controlling energization of the heater 73, based on the difference DIF. The control signal generation circuit 87 outputs the energization pulse Ps to the power supply circuit 88 and the temperature estimation circuit 81. The difference comparison circuit 86 and the control signal generation circuit 87 are configured as described above.

The power supply circuit 88 supplies the power PC to the heater 73 based on the energization pulse Ps. The power supply circuit 88 energizes the heater 73 of the fixing unit 21 by using the supplied DC voltage. For example, the power supply circuit 88 supplies the power PC to the heater 73 by switching between a state in which the DC voltage is supplied to the heater 73 and a state in which the DC voltage is not supplied to the heater 73 based on the energization pulse Ps. That is, the power supply circuit 88 causes an energization time to the heater 73 of the fixing unit 21 varies according to the energization pulse Ps.

The power supply circuit 88 may be integrated with the fixing unit 21. That is, the heater energization control circuit 14 may be configured to supply the energization pulse Ps to the power supply circuit of the heater 73 of the fixing unit 21 instead of supplying the power PC to the heater 73.

The heater energization control circuit 14 adjusts an amount of power supplied to the heater 73 of the fixing unit 21 based on the detected temperature Td, the temperature estimation history PREV, and the energization pulse Ps. Such control is referred to as weighted average control with estimated temperature (WAE) control. Each of the temperature estimation circuit 81, the estimation history holding circuit 82, the high-frequency component extraction circuit 83, the coefficient addition circuit 84, the target temperature output circuit 85, the difference comparison circuit 86, and the control signal generation circuit 87 of the heater energization control circuit 14 may be configured with an electric circuit, or may be configured with software (e.g., program) and executed by a computer.

The temperature correction processing circuit 25 calculates the first temperature difference Ti, which is a temperature difference between the temperature estimation result EST2 estimated by the temperature estimation circuit 81 at the initial stage of operation and the detected temperature Td detected by the temperature sensor 74, and outputs the first temperature difference Ti to the correction information storage circuit 26.

During an operation after the calculation of the first temperature difference Ti, the temperature correction processing circuit 25 calculates a second temperature difference Tc, which is a temperature difference between the temperature estimation result EST2 estimated by the temperature estimation circuit 81 and the detected temperature Td detected by the temperature sensor 74, with a predetermined time interval, at any time.

The first temperature difference Ti and the second temperature difference Tc are compared to calculate a difference Ta which is a difference (e.g., the second temperature difference Tc−the first temperature difference Ti) therebetween. If the difference Ta is equal to or greater than a preset threshold value (e.g., temperature difference) Tth, it is determined that the detected temperature Td is abnormal.

In order to correct the target temperature TGT, the temperature correction processing circuit 25 outputs the target temperature correction signal Tad, which is obtained by subtracting the difference Ta from the target temperature TGT, to the target temperature output circuit 85 based on the determination of the occurrence of the abnormality. In this correction, for example, the target temperature correction signal Tad for changing the target temperature is calculated by subtracting the difference Ta from the target temperature TGT, and the target temperature correction signal Tad is output to the target temperature output circuit 85.

First, the target temperature output circuit 85 outputs, instead of the target temperature TGT, the corrected target temperature TGT2 that is obtained based on the target temperature correction signal Tad to the difference comparison circuit 86. Since the temperature correction described here is an example in which the temperature detected by the temperature sensor 74 is decreased, the target temperature correction signal is calculated by subtracting the difference Ta from the target temperature TGT. On the other hand, in an example in which the temperature detected by the temperature sensor 74 is increased, the target temperature correction signal Tad is calculated by adding the difference Ta to the target temperature TGT.

On the other hand, if the difference between the first temperature difference and the second temperature difference is less than the threshold value Tth, it is determined that the detected temperature Td is normal. If it is determined that the detected temperature Td is normal, the temperature correction processing circuit 25 does not output the target temperature correction signal Tad to the target temperature output circuit 85, and a normal operation thereof is maintained.

The correction information storage circuit 26 stores at least the first temperature difference Ti calculated by the temperature correction processing circuit 25 and the threshold value (e.g., temperature) Tth serving as a determination criterion for determining whether the correction is performed or not. The threshold value Tth can be freely set and changed based on a design. The correction information storage circuit 26 stores or reads the first temperature difference Ti and reads the threshold value Tth under control of the temperature correction processing circuit 25. The correction information storage circuit 26 may be provided in the heater energization control circuit 14 or in the fixing unit 21. The correction information storage circuit 26 may include a counter or a semiconductor memory element such as a flash ROM.

WAE Control

Figure 3:
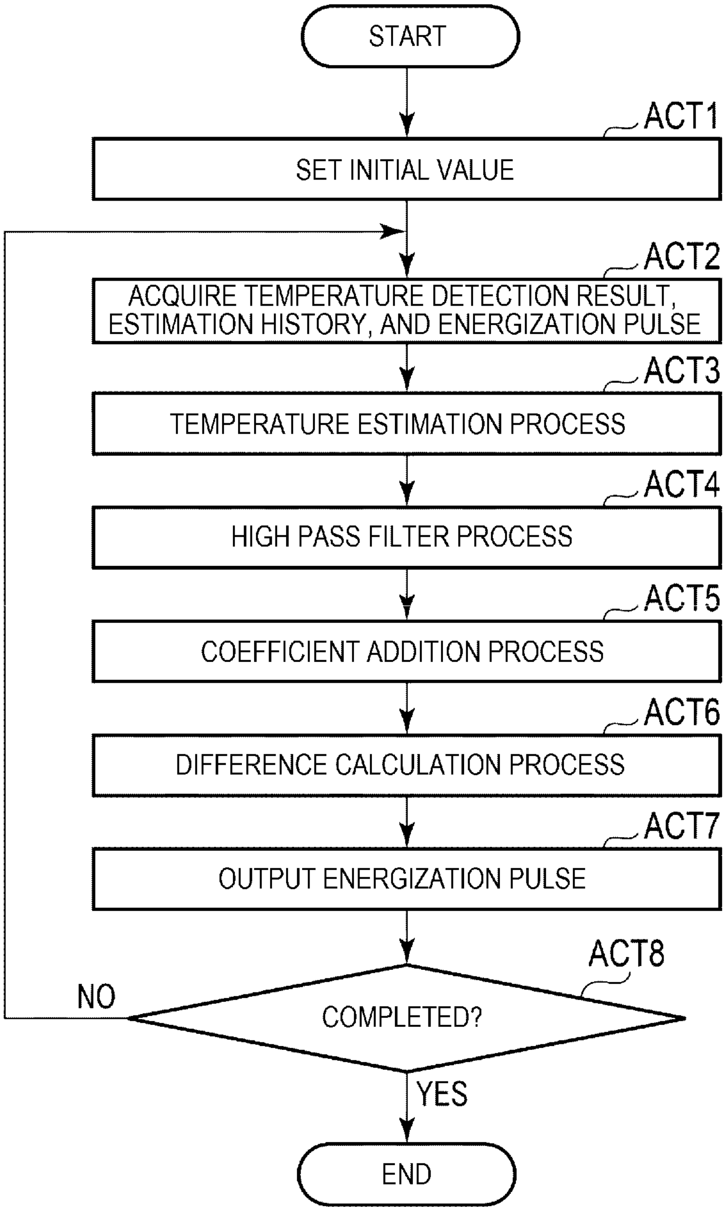
FIG. 3 is a flowchart showing WAE control.
Figure 4:
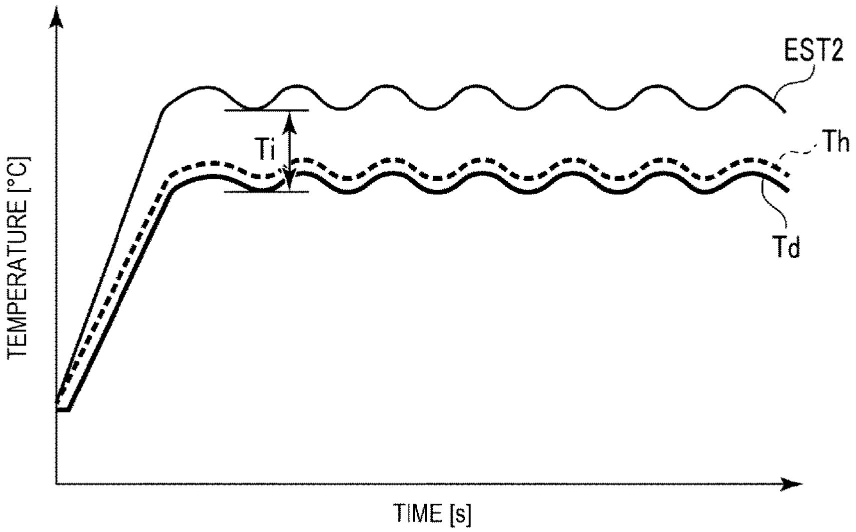
FIG. 4 shows temperature characteristics of a fixing unit in the WAE control.
Figure 8:
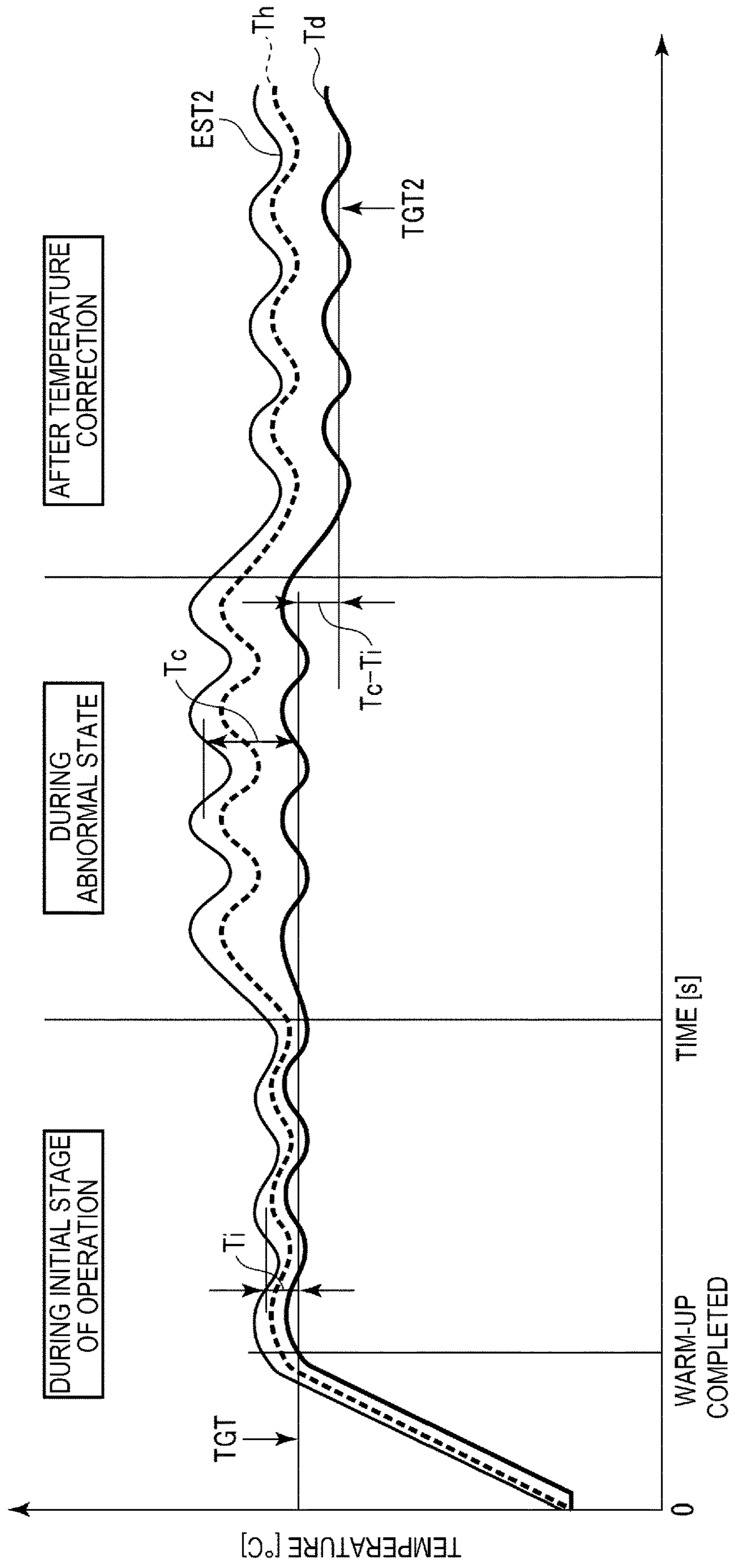
FIG. 8 shows temperature characteristics in a first example of the temperature correction-included temperature control.

Next, the WAE control will be described in detail with reference to a flowchart shown in FIG. 3. FIG. 4 shows the detected temperature Td detected by the temperature sensor 74 at the initial stage of operation of the fixing unit 21 in the WAE control, the temperature estimation result EST2 estimated by the temperature estimation circuit 81, the temperature Th of the surface of the heat roller 71, and the first temperature difference Ti. Here, the temperature sensor is normal, and the first temperature difference Ti and the second temperature difference Tc (Tc is shown in FIG. 8) have the same value.

The heater energization control circuit 14 sets various initial values (e.g., ACT1). For example, the heater energization control circuit 14 sets a coefficient in the coefficient addition circuit 84, the target temperature TGT of the target temperature output circuit 85, and the like based on a signal from the system controller 13.

The temperature estimation circuit 81 of the heater energization control circuit 14 acquires the detected temperature Td from the temperature sensor 74, the estimation history PREV from the estimation history holding circuit 82, and the energization pulse Ps from the control signal generation circuit 87 (e.g., ACT2). In FIG. 4, the actual temperature of the surface of the heat roller 71 (e.g., roller temperature estimation value Th) shows a fine wave change.

If the temperature sensor 74 is slow in response to the temperature change due to an influence of a heat capacity of the temperature sensor 74 or characteristics of a temperature-sensitive material, the detected temperature Td is detected in a state of being delayed with respect to the roller temperature estimation value Th or in a state of being smoothed.

Next, the temperature estimation circuit 81 performs the temperature estimation process (e.g., ACT3). That is, the temperature estimation circuit 81 generates the temperature estimation result EST based on the detected temperature Td, the estimation history PREV, and the energization pulse Ps. The temperature estimation circuit 81 outputs the temperature estimation result EST to the high-frequency component extraction circuit 83 and the estimation history holding circuit 82.

In general, heat transfer can be equivalently expressed by a CR time constant of an electric circuit. A heat capacity can be replaced with a capacitor C. A resistance of heat transfer can be replaced with a resistor R. A heat source can be replaced with a DC voltage source. The temperature estimation circuit 81 estimates an amount of heat given to the heat roller 71 by applying an energization amount to the heater 73, a heat capacity of the heat roller 71, and the like to a CR circuit in which values of each element are set in advance. The temperature estimation circuit 81 estimates the temperature of the surface of the heat roller 71 based on the amount of heat given to the heat roller 71, the detected temperature Td, and the estimation history PREV, and outputs the temperature estimation result EST.

In the temperature estimation circuit 81, supply and interruption of power from the DC voltage source is repeated based on the energization pulse Ps, and the CR circuit operates according to the input voltage pulse to generate an output voltage. Thus, it is possible to estimate heat transmitted to the surface of the heat roller 71, which is the temperature control target. That is, in the temperature estimation result EST output from the temperature estimation circuit 81, an actual surface temperature of the heating member is estimated based on a heat capacity (C) of the heating member, a thermal resistance (R) of the fixing unit, energy input to the fixing unit, and the like. Therefore, when the surface of the heat roller 71 is heated and the temperature of the surface rises due to an increase in the input energy (e.g., supplied power), the temperature estimation result EST also increases. The heat of the heat roller 71 flows out to an external environment through a space (e.g., an external circuit of the heat roller 71) in the fixing unit 21. Therefore, the temperature estimation circuit 81 further includes a CR circuit for estimating the outflow of heat from the heat roller 71 to the external environment. The temperature estimation circuit 81 may further include a CR circuit for estimating an amount of heat flowing from the heat roller 71 to the space in the fixing unit 21.

The high-frequency component extraction circuit 83 performs a high pass filter process for extracting the high-frequency component of the temperature estimation result EST (e.g., ACT4). The high-frequency component HPF, which is a signal indicating the high-frequency component of the temperature estimation result EST, follows a change in the actual surface temperature Th of the heat roller 71.

Next, the coefficient addition circuit 84 performs the coefficient addition process, which is a correction, on the detected temperature Td (e.g., ACT5). The coefficient addition circuit 84 multiplies the high-frequency component HPF by a preset coefficient, adds the high-frequency component HPF multiplied by the coefficient to the detected temperature Td, and calculates the temperature estimation value WAE.

The coefficient addition circuit 84 adjusts, with a coefficient, a value of the high-frequency component HPF to be added to the detected temperature Td, and calculates the temperature estimation value WAE. For example, when the coefficient is 1, the coefficient addition circuit 84 directly adds the high-frequency component HPF to the detected temperature Td. In addition, for example, when the coefficient is 0.1, the coefficient addition circuit 84 adds a value of 1/10 of the high-frequency component HPF to the detected temperature Td. In this case, an effect of the high-frequency component HPF is almost eliminated and becomes close to the detected temperature Td. Further, for example, when the coefficient is 1 or more, the effect of the high-frequency component HPF can be more strongly expressed. An experimental result shows that the coefficient set in the coefficient addition circuit 84 is not an extremely large value, but a value close to 1 is good.

In the WAE control, a fine change in the surface temperature of the heat roller 71 is estimated based on the detected temperature Td and the high-frequency component HPF of the temperature estimation result EST. The temperature estimation value WAE is a value that appropriately follows the surface temperature of the heat roller 71.

The difference comparison circuit 86 calculates a difference DIF between the target temperature TGT including the target temperature correction signal from the target temperature output circuit 85 and the temperature estimation value WAE from the coefficient addition circuit 84, and outputs the difference DIF to the control signal generation circuit 87 (e.g., ACT6).

The control signal generation circuit 87 generates the energization pulse Ps based on the difference DIF. The control signal generation circuit 87 outputs the energization pulse Ps to the power supply circuit 88 and the temperature estimation circuit 81 (e.g., ACT7). The power supply circuit 88 supplies the power PC to the heater 73 based on the energization pulse Ps.

The difference DIF indicates relation between the target temperature TGT and the temperature estimation value WAE. For example, if the relation is that the temperature estimation value WAE is greater than the target temperature TGT (e.g., corrected target temperature TGT2), the energization amount to the heater 73 is reduced and the surface temperature of the heat roller is decreased by performing control such as narrowing a width of the energization pulse Ps or reducing a frequency of the energization pulse Ps. Further, if the relation is that the temperature estimation value WAE is smaller than the target temperature TGT (e.g., corrected target temperature TGT2), the energization amount to the heater 73 is increased and the surface temperature of the heat roller is increased by performing control such as increasing the width of the energization pulse Ps or increasing the frequency of the energization pulse Ps.

According to the difference DIF, it is possible to grasp not only magnitude relation between the temperature estimation value WAE and the target temperature TGT (e.g., corrected target temperature TGT2), but also how much the estimated temperature WAE and the target temperature TGT are deviated from each other. For example, when (the absolute value of) the difference DIF is a large value, a deviation between the temperature estimation value WAE and the target temperature TGT is large, and therefore the above-described control may be largely changed. Further, for example, when (the absolute value of) the difference DIF is a small value, the deviation between the temperature estimation value WAE and the target temperature TGT is small, and therefore the above-described control may be performed gently.

The processor 22 of the system controller 13 determines whether the WAE control is completed or not (e.g., ACT8). In ACT8, if the processor 22 determines that the WAE control is continued instead of being completed (e.g., ACT8: NO), the process proceeds to the above-described process in ACT2. On the other hand, if the processor 22 determines that the WAE control is completed according to a stop of the device by the OFF operation of the main power switch 24 (e.g., ACT8: YES), the processing routine ends.

As described above, when the heater energization control circuit 14 performs a process of a certain cycle (e.g., the cycle), the heater energization control circuit 14 performs the WAE control based on values (e.g., the energization pulse Ps, the temperature estimation result EST, and the estimation history PREV) in a previous cycle and the detected temperature Td in the cycle. That is, the heater energization control circuit 14 inherits a value in a next cycle. The heater energization control circuit 14 re-executes the temperature estimation calculation based on a history of a previous calculation. Therefore, the heater energization control circuit 14 always performs the calculation during the operation. In the heater energization control circuit 14, a calculation result is held in a memory or the like, and is reused in the calculation of the next cycle.

Temperature Correction Process

Next, the temperature correction processing circuit 25 will be described in detail.

Figure 5:
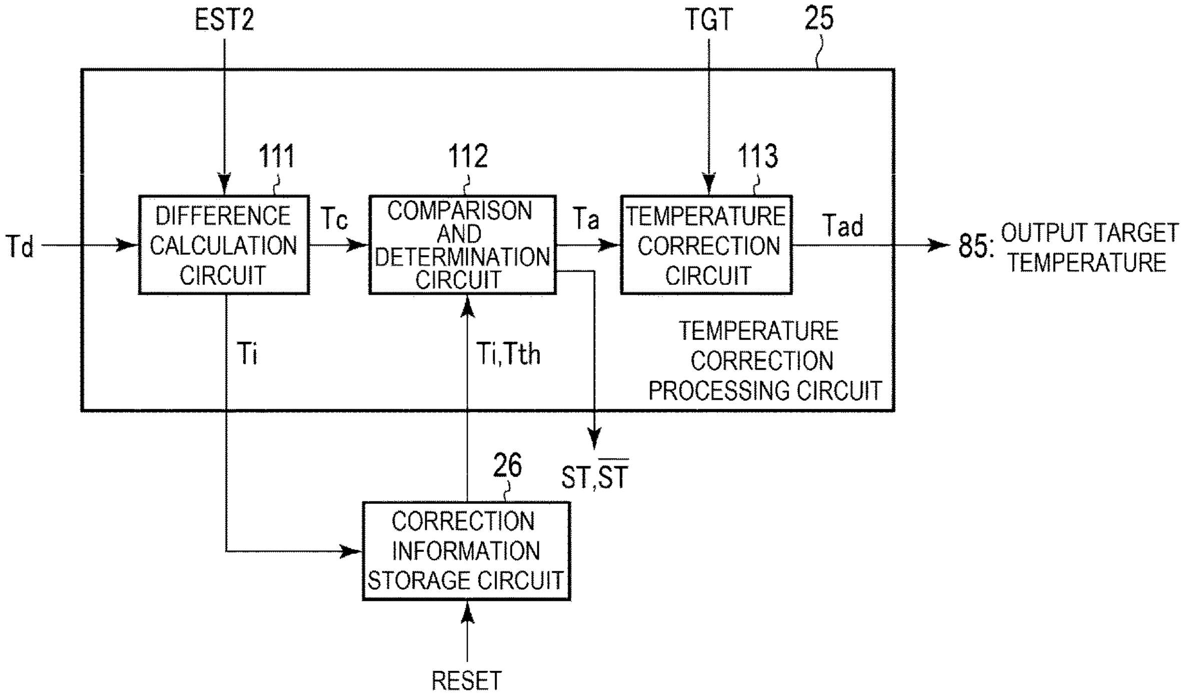
FIG. 5 is a block diagram showing a configuration example of a temperature correction processing circuit.

FIG. 5 is a block diagram showing a configuration example of the temperature correction processing circuit 25. The temperature correction processing circuit 25 includes a difference calculation circuit 111, a comparison and determination circuit 112, and a temperature correction circuit 113.

As shown in FIG. 5, the temperature estimation result EST2 (equivalent to the temperature estimation result EST) output from the temperature estimation circuit 81 in the WAE control and the detected temperature Td detected by the temperature sensor 74 are input to the difference calculation circuit 111. The temperature estimation result EST2 and the detected temperature Td are compared, and differences (e.g., the first temperature difference Ti, the second temperature difference Tc) that are temperature differences (the temperature estimation result EST2−the detected temperature Td) are calculated. The calculated first temperature difference Ti is output to the correction information storage circuit 26, and the calculated second temperature difference Tc is output to the comparison and determination circuit 112.

Here, the first temperature difference Ti is a difference between the detected temperature Td detected by the temperature sensor 74 calculated at the initial stage of operation (e.g., initial time) of the fixing unit 21 and the temperature estimation result EST2. As described above, whether the fixing unit 21 is in the initial stage of operation or not can be determined based on an instruction from the system controller 13 or information of whether the first temperature difference Ti is stored in the correction information storage circuit 26 or not.

The second temperature difference Tc is a difference between the detected temperature Td detected by the temperature sensor 74 and a current temperature estimation result EST2 estimated by the temperature estimation circuit 81, and the difference is calculated at a preset timing or time interval during an operation after the first temperature difference Ti is calculated.

The comparison and determination circuit 112 obtains a temperature difference Ta (e.g., Ta=Tc−Ti), which is a difference between the first temperature difference Ti read from the correction information storage circuit 26 and the calculated second temperature difference Tc, at any time, compares the temperature difference Ta with the threshold value (e.g., temperature) Tth, and determines whether to perform the temperature correction or not. In this determination, if the temperature difference Ta is equal to or greater than the threshold value Tth, that is, if the temperature difference Ta the threshold value Tth, it is determined that a temperature abnormality occurs in the detected temperature Td, and it is determined to correct the target temperature TGT. In the determination of whether to perform the temperature correction or not, if the temperature difference Ta is smaller than the threshold value Tth, that is, if the temperature difference Ta<the threshold value (e.g., temperature) Tth, it is determined that the fixing unit 21 is in a normal operation state and not to correct the target temperature TGT.

If the comparison and determination circuit 112 determines to perform the temperature correction, the temperature correction circuit 113 generates a target temperature correction signal obtained by correcting the target temperature TGT, and outputs the target temperature correction signal to the target temperature output circuit 85. In this correction, for example, the temperature difference Ta is subtracted from the target temperature TGT, and the subtraction result is output to the target temperature circuit 85 as the target temperature correction signal Tad.

The temperature correction processing circuit 25 may output, to the system controller 13, a normal signal or abnormality occurrence signal that indicates the determination result of the comparison and determination circuit 112. The temperature correction processing circuit 25 outputs an abnormality occurrence signal ST to the system controller 13, for example, when the determination result from the comparison and determination circuit 112 is a temperature abnormality. The system controller 13 receives the abnormality occurrence signal ST, and causes the image forming apparatus to temporarily stop printing on the recording medium or stand by. Then, when the temperature correction is performed by the temperature correction circuit 113 and the determination result of the comparison and determination circuit 112 is normal, the temperature correction processing circuit 25 outputs a normal signal (for example, an inverted signal STBar of the abnormality occurrence signal ST) to the system controller 13. The system controller 13 receives the normal signal, and resumes or starts printing on the recording medium.

Here, in the WAE control, in order to compare with the present embodiment, temperature characteristics in a device configuration to which the temperature correction according to the present embodiment is not applied will be described with reference to FIG. 6. The temperature characteristics are described as an example of an abnormality in which the detected temperature Td detected by the temperature sensor 74 is decreased.

In the temperature sensor 74, if a detection unit is deformed, a position of the detection unit is deviated due to looseness of an attachment portion, foreign matter is caught between the temperature sensor 74 and the heat roller 71, and/or contamination occurs on the surface of the heat roller 71, then the surface temperature Th of the heat roller 71 may not be correctly detected even if the temperature sensor 74 itself is normal.

As described above, when the temperature detected by the temperature sensor 74 is abnormal, for example, when a temperature lower than an actual temperature is detected, in order to return the temperature detected by the temperature sensor 74 to an original target temperature, there is a possibility that temperature control is performed such that the amount of power supplied to the heat roller 71 is increased, and the surface temperature of the heat roller 71 is further heated to a temperature higher than the surface temperature Th of the heat roller 71 in a normal state.

Figure 6:
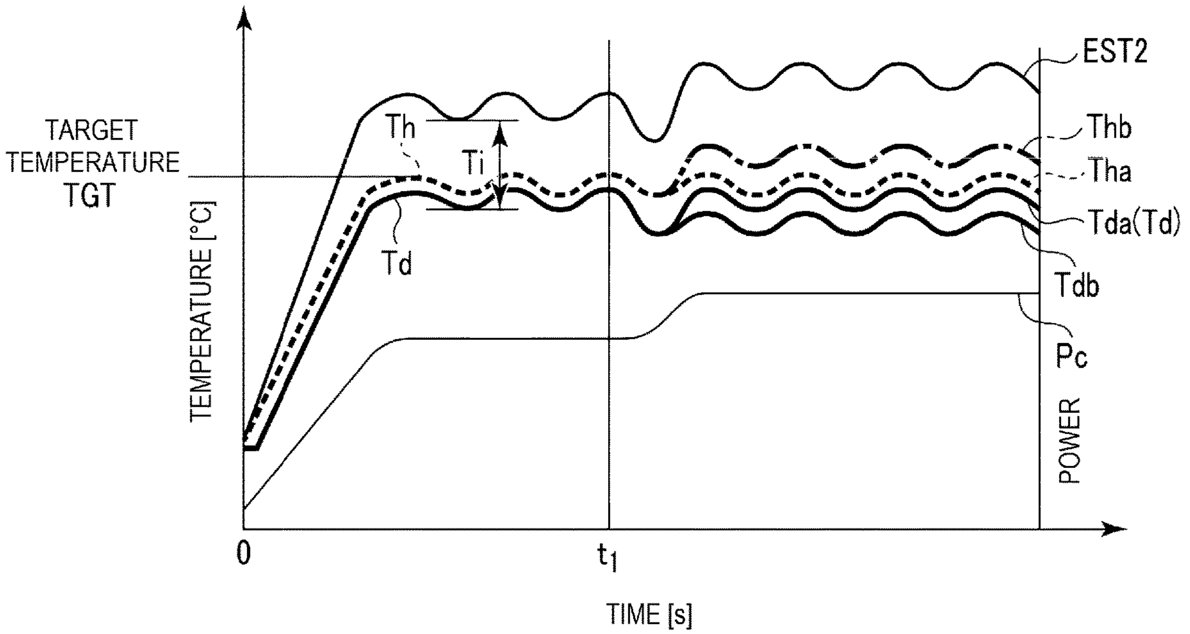
FIG. 6 shows temperature characteristics when a detected temperature of a temperature sensor lower than an actual temperature is detected.

FIG. 6 shows the temperature characteristics when the temperature Td detected by the temperature sensor 74 is detected to be a temperature lower than the actual temperature.

The temperature characteristics are shown as temperature characteristics of the detected temperature Td of the temperature sensor 74, the temperature estimation value WAE, and/or the surface temperature Th of the heat roller 71 in the normal state in the WAE control. These temperature characteristics are similar to those temperature characteristics in FIG. 4 from a time 0 to a time t1 in a time axis.

Here, in the temperature characteristics after the time t1 at which the temperature abnormality of the detected temperature Td due to contamination or the like occurs, on a device side on which the WAE control is performed, in order to return the detected temperature Td of the temperature sensor 74 to the original target temperature, the power PC supplied to the heat roller 71 is increased, and the surface temperature Th of the heat roller 71 is increased. As described above, since the power PC supplied to the heat roller 71 is increased, the temperature estimation result EST is also increased as a result.

Specifically, since the detected temperature Td of the temperature sensor 74 is lowered to a detected temperature Tdb, it is determined that the surface temperature Th of the heat roller 71 is also decreased. According to this determination, the power PC supplied from the power supply circuit 88 to the heater 73 is increased in order to return the surface temperature Th of the heat roller 71 to the target temperature TGT. By this temperature control, the detected temperature Td of the temperature sensor 74 that is not decreased actually is apparently returned from the detected temperature Tdb to the detected temperature Td (Tda) of the target temperature TGT. The temperature characteristics recognized by the device side at this time are shown by the detected temperature Tda of the temperature sensor 74, the temperature estimation result EST2, and the surface temperature Tha of the heat roller 71 shown in FIG. 6.

However, since the power PC supplied to the heater 73 is increased, actually, the surface temperature Th of the heat roller 71 whose temperature is not low is further heated, and becomes a surface temperature Thb that is higher than the target temperature (e.g., set temperature) TGT. Due to the surface temperature Thb of the heated heat roller 71, an image defect such as fixing offset may occur.

Figure 7:
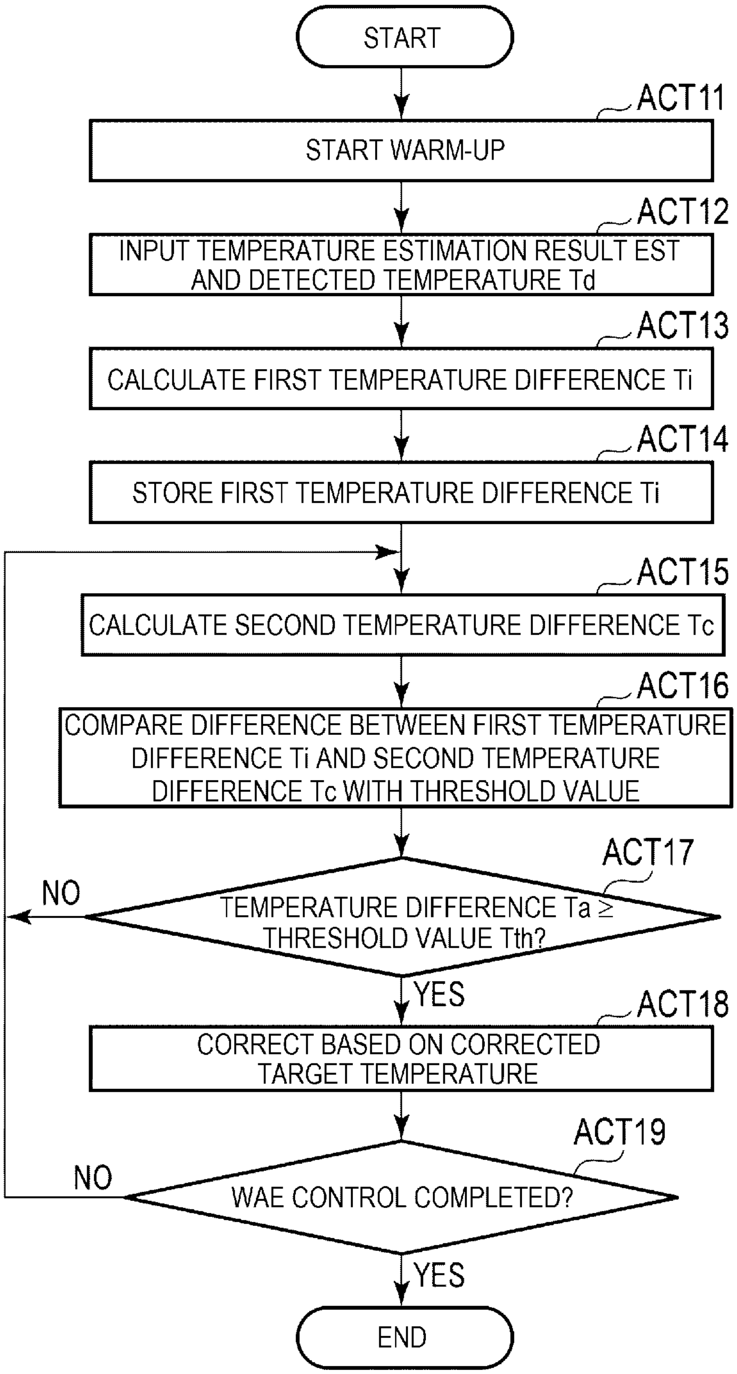
FIG. 7 is a flowchart showing temperature correction-included temperature control performed by the temperature control device.

Next, the temperature correction-included temperature control performed by the temperature control device 101 of the present embodiment will be described with reference to a flowchart shown in FIG. 7. In this example, the temperature control device 101 is mounted in the image forming apparatus 1.

First, the image forming apparatus 1 is started up by turning on the main power switch 24. The system controller 13 of the image forming apparatus 1 brings each component into an initial state in order to execute printing. At this time, the heater energization control circuit 14 of the temperature control device 101 supplies power to the heater 73 to heat the heat roller 71, and warm-up for starting the printing is started (e.g., ACT11). Along with the warm-up, the WAE control is started.

When the surface temperature of the heat roller 71 is within a range set based on the target temperature TGT after the warm-up is completed, the temperature estimation result EST2 output from the temperature estimation circuit 81 and the detected temperature Td detected by the temperature sensor 74 are input to the difference calculation circuit 111 of the temperature control device 101 (e.g., ACT12).

The difference calculation circuit 111 compares the temperature estimation result EST2 with the detected temperature Td, obtains a difference (e.g., the temperature estimation result EST2−the detected temperature Td), and calculates a first temperature difference Ti, which is the difference (e.g., temperature difference) (ACT13). At this time, the difference calculation circuit 111 repeatedly calculates the first temperature difference Ti a plurality of times in a short time, for example, about 5 times to 10 times, and calculates an average value of a plurality of first temperature differences Ti. The calculated average value of the first temperature differences Ti is stored in the correction information storage circuit 26 (e.g., ACT14). As described above, the calculation of the first temperature difference Ti is performed at the initial stage of operation of the fixing unit 21.

Next, during the operation after the calculation of the first temperature difference Ti, the difference calculation circuit 111 compares the temperature estimation result EST2 with the detected temperature Td at a preset timing or time interval, calculates the difference (e.g., the temperature estimation result EST2−the detected temperature Td), and outputs the second temperature difference Tc, which is the difference, to the comparison and determination circuit 112 (e.g., ACT15).

Next, the comparison and determination circuit 112 compares the first temperature difference Ti read from the correction information storage circuit 26 with a currently calculated second temperature difference Tc, and obtains the temperature difference Ta that is the difference (e.g., Tc−Ti) between the first temperature difference Ti and the second temperature difference Tc. The comparison and determination circuit 112 compares the temperature difference Ta with the threshold value (e.g., temperature) Tth (e.g., ACT16).

The comparison and determination circuit 112 determines whether to perform the temperature correction of the target temperature TGT or not based on the comparison result between the temperature difference Ta and the threshold value Tth (e.g., ACT17). If it is determined in ACT17 that the temperature difference Ta≥the threshold value Tth (e.g., ACT17: YES), the process proceeds to a next correction process (e.g., ACT18). That is, if the temperature difference Ta the threshold value Tth, it is determined that an abnormality occurs in the detected temperature Td and that the target temperature TGT needs to be corrected. On the other hand, if it is determined in ACT17 that the temperature difference Ta is smaller than the threshold value Tth (e.g., ACT17: NO), it is determined that the detected temperature Td is normal and that the target temperature TGT does not need to be corrected, and the process returns to ACT15. That is, if the temperature difference Ta<the threshold value (e.g., temperature) Tth, it is determined that the fixing unit 21 is in a normal operation state, and the target temperature TGT is not to be corrected.

In ACT18, the temperature correction circuit 113 generates the target temperature correction signal Tad for correcting the target temperature TGT, and outputs the target temperature correction signal Tad to the target temperature output circuit 85. In this correction, for example, the target temperature output circuit 85 sets the corrected target temperature TGT2 based on the target temperature correction signal Tad as a new target temperature to replace the previous target temperature TGT. The difference comparison circuit 86 generates a corrected difference DIF based on the corrected target temperature TGT2, and outputs the difference DIF to the control signal generation circuit 87.

Next, the processor 22 of the system controller 13 determines whether the WAE control is completed or not (e.g., ACT19). In ACT19, if the processor 22 determines that the WAE control is continued instead of being completed (e.g., ACT19: NO), the process returns to the above-described ACT15. On the other hand, if the processor 22 determines that the WAE control is completed according to a stop instruction of the device by an OFF operation of the main power switch 24 (e.g., ACT19: YES), the processing routine ends.

As specific examples of numerical values of the temperature, the target temperature TGT is set to 180° C. and the threshold value (e.g., temperature) Tth is set to 4° C. The surface temperature of the heat roller 71 is set to 180° C., which is the same as the target temperature TGT. The stored first temperature difference Ti is set to 5° C.

Next, if the second temperature difference Tc detected during the operation is 10° C., the temperature difference Ta between the second temperature difference Tc and the first temperature difference Ti is 5° C. Since 5° C. 4° C. holds in the comparison of whether the temperature difference Ta the threshold value Tth, it is determined that the target temperature TGT needs to be corrected. Therefore, when the temperature difference Ta is 5° C., the corrected target temperature TGT2, which is 175° C., is lower than the target temperature TGT 180° C. by 5° C., and is set as a new target temperature.

The difference comparison circuit 86 generates a difference DIF between the temperature estimation value WAE (175° C.), which is lowered by the temperature difference Ta of 5° C., and the corrected target temperature TGT2 (175° C.) that is the new target temperature. Therefore, the numerical value does not change even when compared with the difference DIF between the temperature estimation value WAE (180° C.) in the previous normal state and the target temperature TGT (180° C.). Therefore, since the power PC is generated based on the difference DIF of the same value, even if the detected temperature Td decreases, the supplied power PC does not change. Therefore, the surface temperature Th of the heat roller 71 is maintained at 180° C. without being changed.

In the present embodiment described above, in the WAE control, if the detected temperature Td decreases, the corrected target temperature value TGT2 obtained by subtracting the decreased temperature from the target temperature value TGT is generated. Therefore, since the difference DIF between the decreased temperature estimation value WAE and the corrected target temperature value TGT2 is equal to the difference DIF between the temperature estimation value WAE obtained at the normal detected temperature Td at which the temperature is not decreased and the target temperature value TGT, it is determined that the surface temperature of the heat roller 71 is not changed. According to this determination, the power PC output from the power supply circuit 88 is not increased, and the power PC supplied so far is maintained. As described above, even if the temperature of the detected temperature Td detected by the temperature sensor 74, which operates normally, decreases, the surface temperature Th of the heat roller 71 is maintained without being increased, so that an image defect such as fixing offset does not occur. A malfunction or failure of the temperature sensor 74 itself is detected by another detection method that is generally used on a circuit side on which the temperature sensor 74 is driven.

First Example

FIG. 8 shows temperature characteristics in a first example of the temperature correction-included temperature control according to the present embodiment. The temperature control is performed by the temperature control device 101 having the configuration shown in FIG. 2 and FIG. 5. The temperature characteristics in FIG. 8 show the temperature characteristics of the detected temperature Td of the temperature sensor 74, the temperature estimation value WAE (in real time), and the surface temperature Th of the heat roller 71 in the normal state in the WAE control, which are similar to those in FIG. 4 from the time 0 to the time t1 in the time axis. If an abnormality occurs in the detected temperature Td of the temperature sensor 74, the detected temperature Td of the temperature sensor 74 is detected as a temperature lower than an actual temperature, similarly to the above-described FIG. 6. For this decrease in the detected temperature Td, for example, it is assumed that the temperature sensor 74 itself normally operates, but a detection position is deviated due to looseness of a sensor attachment tool, and an abnormality occurs in the detected temperature Td.

First, after the warm-up in the initial stage of operation is completed, the temperature correction processing circuit 25 calculates the first temperature difference Ti, which is the difference (or temperature difference) between the temperature estimation result EST calculated by the temperature estimation circuit 81 and the detected temperature Td detected by the temperature sensor 74, and stores the first temperature difference Ti in the correction information storage circuit 26.

Thereafter, when a temperature abnormality in which the detected temperature Td decreases occurs, the power PC is increased in order to prevent decrease of the surface temperature Tth of the heat roller 71 from the target temperature TGT on the device side on which the WAE control is performed. By the WAE control, the detected temperature Td is maintained so as to return to an original value, but since the power PC is increased, the surface temperature Th of the heat roller 71 increases and the temperature estimation result EST increases.

According to the present embodiment described above, after the first temperature difference Ti is calculated, the temperature estimation result EST calculated by the temperature estimation circuit 81 is compared with the detected temperature Td at the predetermined timing or time interval to obtain a difference therebetween, and the second temperature difference Tc is calculated.

The comparison and determination circuit 112 obtains the temperature difference Ta, which is the difference between the first temperature difference Ti and the second temperature difference Tc, and compares the temperature difference Ta with the threshold value (temperature) Tth. If the temperature difference Ta≥the threshold value Tth, it is determined that an abnormality occurs in the detected temperature Td and that the target temperature TGT needs to be corrected. The comparison and determination circuit 112 outputs the abnormality occurrence signal ST to the system controller 13. The system controller 13 receives the abnormality occurrence signal, and causes the display circuit 15 to display that a printing process is to be on standby, and interrupts printing to enter a standby state.

In this correction, the temperature difference Ta is subtracted from the target temperature TGT, and the subtraction result is set as the target temperature correction signal Tad. The target temperature output circuit 85 generates the corrected target temperature TGT2, which is the corrected target temperature, based on the target temperature correction signal Tad, and outputs the corrected target temperature TGT2 to the difference comparison circuit 86. Since the difference comparison circuit 86 similarly generates the difference DIF between the corrected target temperature TGT2 whose temperature is changed and the temperature estimation value WAE, the numerical value of the difference DIF does not change as compared with the difference DIF in the normal state. Since the power PC is generated based on the same difference DIF, the power PC when the temperature estimation value WAE is in the normal state is supplied even if the detected temperature Td decreases, so that the surface temperature Th of the heat roller 71 does not change.

Second Example

Next, a second example of the temperature correction-included temperature control according to the embodiment will be described. The second example is an example in which an abnormality occurs in a detection state of the temperature sensor 74 before the image forming apparatus 1 starts to operate. For example, it is assumed that the first temperature difference Ti is already stored in the correction information storage circuit 26. It is assumed that, when the image forming apparatus 1 is moved due to a move or a change in an installation position, as described above, the temperature sensor 74 itself operates normally, but an abnormal state occurs in which the detection position is deviated due to looseness of the sensor attachment tool and the detected temperature Td is decreased.

The image forming apparatus 1 is started up, and after the warm-up is completed and before the printing is started, the temperature estimation result EST2 estimated by the temperature estimation circuit 81 is compared with the detected temperature Td to obtain a difference, and the second temperature difference Tc is calculated.

At this time, the detected temperature Td which is decreased is detected, and the detected temperature Td has the temperature characteristic of the abnormal state shown in FIG. 8. Therefore, the calculated temperature estimation result EST2 is also detected at a high temperature. Here, the temperature difference Ta, which is the difference between the first temperature difference Ti and the second temperature difference Tc, is obtained and compared with the threshold value (e.g., temperature) Tth. If the temperature difference Ta≥the threshold value Tth, it is determined that an abnormality occurs in the detected temperature Td and that the target temperature TGT needs to be corrected. Based on the determination of the temperature abnormality, the system controller 13 causes the display unit 15 to display that an error occurs and the printing process is in a standby state, and causes the image forming apparatus 1 to wait for a start of printing.

Next, in the correction of the target temperature TGT, as described above, the temperature difference Ta is subtracted from the target temperature TGT, and the subtraction result is set as the target temperature correction signal. By correcting the target temperature TGT to the corrected target temperature TGT2 based on the target temperature correction signal Tad, a corrected difference DIF is generated based on the corrected target temperature TGT2 and the temperature estimation value WAE, both of which change in temperature in the same manner. The corrected difference DIF is equivalent to the difference DIF in the normal state, and the numerical value does not change. Therefore, since the power PC is generated based on the same difference DIF, even if a change occurs in the detected temperature Td, the supplied power PC does not change and is maintained at a constant value. After such temperature correction is completed, the system controller 13 resumes the printing process.

As described above, according to the temperature control device of the present embodiment, when an abnormality occurs in the temperature detected by the temperature sensor, in order to make the temperature estimation result EST match the change, the target temperature TGT is corrected.

For example, when the temperature detected by the temperature sensor is decreased due to an abnormality, since the target temperature TGT is decreased so as to match the decreased temperature estimation value in the WAE control, there is no change in the difference between the temperature estimation value WAE in the normal state and the target temperature TGT and the difference between the temperature estimation value WAE in the WAE control and the corrected target temperature TGT2, which are decreased, and the supplied power PC also does not change. Therefore, even if the temperature Td detected by the temperature sensor 74 decreases, the supplied power PC does not change, and the surface temperature Th of the heat roller 71 does not change.

By the temperature control of the present embodiment described above, it is possible to prevent an increase in the surface temperature Th of the heat roller 71 and to prevent occurrence of an image defect such as fixing offset. When an abnormality in the temperature detected by the temperature sensor is detected, printing on the recording medium is interrupted or a start of printing is waited, so that it is possible to prevent an unnecessary printing failure on the recording medium.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A temperature control device configured to control power to be supplied to a heater, comprising:
a temperature estimation circuit configured to estimate a temperature estimation value;
a difference calculation circuit configured to:
calculate a first temperature difference between the temperature estimation value estimated during an initial operation and a detected temperature detected by a temperature sensor, and
calculate a second temperature difference between the temperature estimation value estimated for each set time during an operation of a fixer after the initial operation and the detected temperature detected by the temperature sensor;
a storage configured to store the first temperature difference and a threshold value; and
a comparison and determination circuit configured to compare the second temperature difference with the first temperature difference that is read from the storage, and determine to correct the temperature estimation value in response to a difference in a comparison result that is equal to or greater than the threshold value,
wherein when a determination result for correcting the temperature estimation value is output from the comparison and determination circuit, the temperature control device is configured to set equipment related to the fixer into a standby state in response to the difference calculated using the second temperature difference acquired for each set time being less than the threshold value.

2. The temperature control device of claim 1, wherein
the temperature control device controls power to be supplied to the heater of the fixer such that a temperature control target to which heat is transferred from the heater reaches a target temperature, and
the initial operation is executed when the fixer is operated for a first time after being manufactured.

3. The temperature control device of claim 1, wherein
the temperature control device controls power to be supplied to the heater of the fixer such that a temperature control target to which heat is transferred from the heater reaches a target temperature, and
the initial operation is executed when the fixer is operated for a first time after being replaced.

4. The temperature control device of claim 1, wherein
the temperature control device controls power to be supplied to the heater of the fixer such that a temperature control target to which heat is transferred from the heater reaches a target temperature, and
the initial operation is executed when the fixer is operated for a first time after replacement of components related to heat in the fixer.

5. The temperature control device of claim 1, wherein the temperature control device controls power to be supplied to the heater of the fixer such that a temperature control target to which heat is transferred from the heater reaches a target temperature, and
the initial operation is executed when the fixer is operated for a first time after repair of components of the heater in the fixer.

6. The temperature control device of claim 1, wherein
the temperature control device controls power to be supplied to the heater of a fixer such that a temperature control target to which heat is transferred from the heater reaches a target temperature, and
the difference calculation circuit calculates the first temperature difference during an initial operation after manufacturing of the fixer.

7. The temperature control device of claim 1, wherein
the temperature control device controls power to be supplied to the heater of a fixer such that a temperature control target to which heat is transferred from the heater reaches a target temperature, and
the difference calculation circuit calculates the first temperature difference during an initial operation after replacement of the fixer.

8. The temperature control device of claim 1, wherein
the temperature control device controls power to be supplied to the heater of a fixer such that a temperature control target to which heat is transferred from the heater reaches a target temperature, and
the difference calculation circuit calculates the first temperature difference during an initial operation after replacement and repair of a heat-related component in the fixer.

9. The temperature control device of claim 1, wherein the temperature control device controls power to be supplied to the heater of the fixer such that a temperature control target to which heat is transferred from the heater reaches a target temperature, and
the temperature sensor includes a plurality of sensors that are disposed at different positions with respect to the fixer.

10. The temperature control device of claim 1, further comprising a temperature correction circuit configured to generate a corrected target temperature based on the temperature estimation value.

11. The temperature control device of claim 10, further comprising a control signal generation circuit configured to output an energization pulse for controlling the power based on the temperature estimation value of the temperature control target estimated by the temperature estimation circuit and the corrected target temperature obtained by the temperature correction circuit performing temperature correction.

12. The temperature control device of claim 11, wherein the temperature estimation circuit estimates a temperature based on a capacitor-resistor circuit in which a heat capacity is replaced by a capacitor and a resistance of heat transfer is replaced by a resistor, the energization pulse, and a preceding temperature estimation value.

13. The temperature control device of claim 12, wherein the difference calculation circuit detects the detected temperature a plurality of times when a temperature change after activation is within a predetermined range with respect to a target temperature, and sets an average value of calculation results of the detected temperatures and the temperature estimation value as the first temperature difference.

14. The temperature control device of claim 1, wherein the first temperature difference is erased from the storage in the initial operation.

15. The temperature control device of claim 1, wherein when a determination result for correcting the temperature estimation value is output from the comparison and determination circuit, the temperature control device interrupts an operation of an equipment related to the fixer in response to the difference calculated using the second temperature difference acquired for each set time being less than the threshold value.

* * * * *